Oct. 23, 1923.

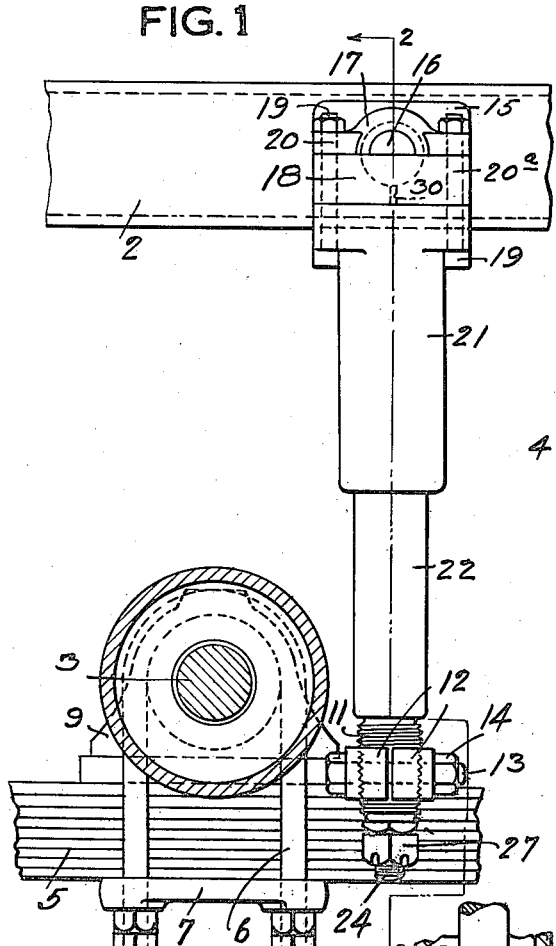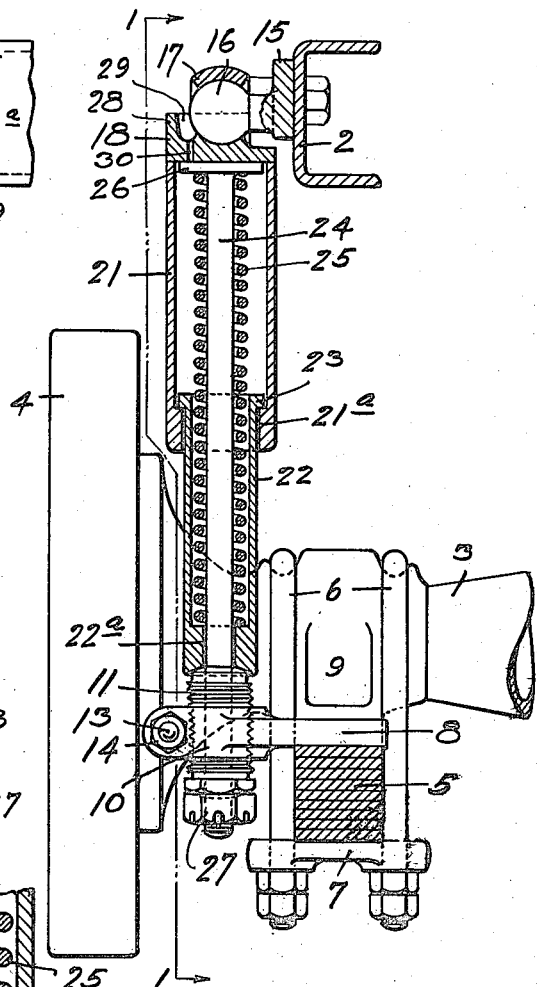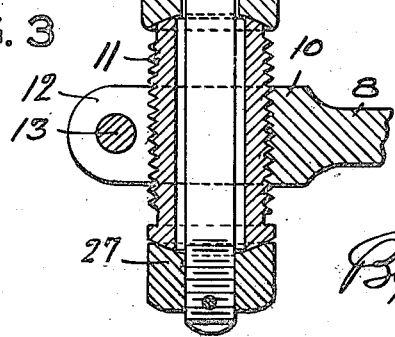

J. DAHLSTROM

SHOCK ABSORBER

Filed March 18, 1921    2 Sheets-Sheet 2

1,471,474

INVENTOR
John Dahlstrom
By Kay, Totten & Brown,
Attorneys

Patented Oct. 23, 1923.

1,471,474

UNITED STATES PATENT OFFICE.

JOHN DAHLSTROM, OF PITTSBURGH, PENNSYLVANIA.

SHOCK ABSORBER.

Application filed March 18, 1921. Serial No. 453,410.

*To all whom it may concern:*

Be it known that I, JOHN DAHLSTROM, a citizen of the United States, and resident of Pittsburgh, in the county of Allegheny and State of Pennsylvania, have invented a new and useful Improvement in Shock Absorbers; and I do hereby declare the following to be a full, clear, and exact description thereof.

My invention relates to shock absorbers for motor vehicles and it has for its object to provide a shock absorber which shall be simple in construction and effective in operation and which, more specifically, shall consist of one or more compression springs so mounted as to yieldingly resist both downward movement and upward or rebounding movement of the vehicle.

Another object of my invention is to provide a shock absorber comprising a vertically arranged compression spring having means for permitting the spring and its attachments to yield laterally in response to the relative lateral movement of the body of the vehicle and its axle.

A further object of my invention is to provide improved means for attaching a shock absorber to the vehicle body and springs.

A still further object of my invention is to provide a shock absorber with a vertical spring having two portions of different strength for absorbing different degrees of shock, and also having means for re-cushioning the rebound of the vehicle after the initial shock is absorbed.

Figure 4:
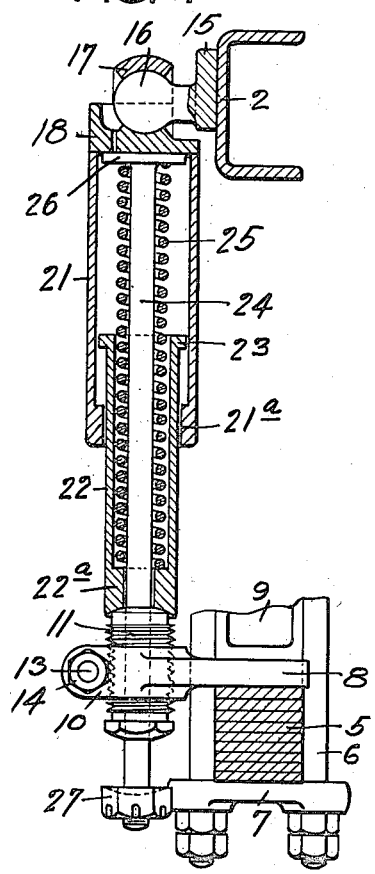
Figure 5:
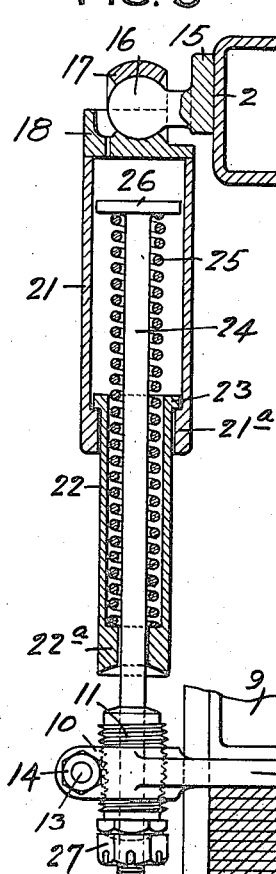
Figure 6:
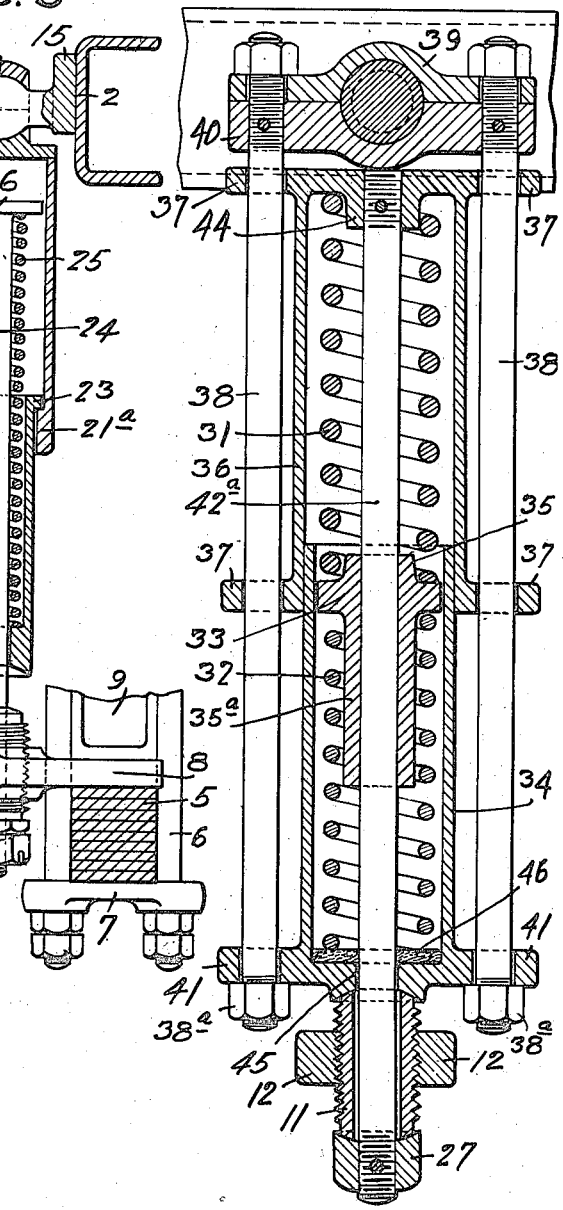
Figure 7:
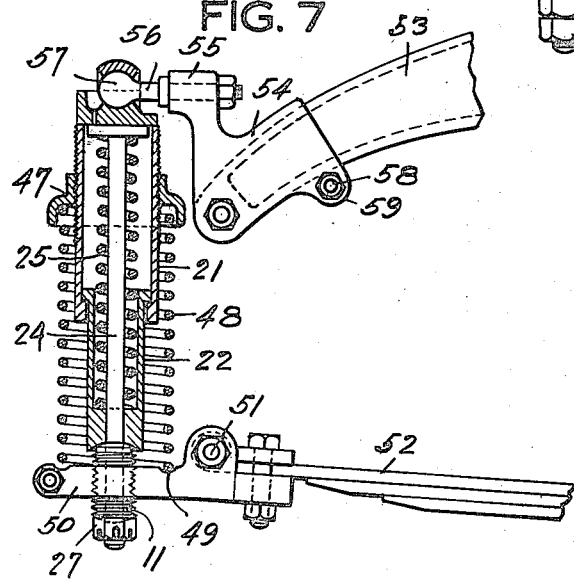

In the accompanying drawing Fig. 1 is a side elevational view, with parts in section, showing one form of my improved shock absorber; Fig. 2 is a vertical sectional view substantially on the line 2—2, Fig. 1, showing the spring in its neutral position; Fig. 3 is an enlarged fragmentary vertical section on the line 2—2, Fig. 1, showing the manner in which the shock absorber is attached to the vehicle spring; Fig. 4 is a vertical sectional view similar to Fig. 2 showing the spring compressed by the downward movement of the vehicle frame with respect to the axle; Fig. 5 is another similar vertical section showing the spring compressed by the relative separation of the vehicle frame and axle; Fig. 6 is a side view partly in elevation and partly in section of a modified form of my device; and Fig. 7 is a vertical sectional view of another modification.

Referring to Figs. 1 to 3 of the drawing the numeral 2 designates one of the side sills of a vehicle chassis, and 3 indicates the axle of the vehicle carrying the usual brake-drum 4 and supported on the springs 5 by means of shackle bolts 6 and plates 7.

A bracket 8 is inserted between the spring 5 and the bearing 9 of the axle 3 and is provided with a lateral head 10 which is divided and screw-threaded to receive a sleeve 11. The two halves 12 of the divided bracket are forced together to clamp the sleeve 11 by means of a bolt 13 and a nut 14.

A bracket 15 is secured to the side sill 2 of the vehicle and is provided with a spherical head 16 which is received in a socket composed of an upper portion 17 and a lower portion 18, these two portions being secured together by means of bolts 19 passing through openings in lateral ears 20 and $20^a$ in the upper and lower socket portions. The lower portion 18 of the socket is attached by means of the bolt 19 to a tubular casing 21 which may be either circular or rectangular in cross section, and which is provided with a reduced lower portion $21^a$ through which slides a second casing 22 having a flange 23 around its upper edge to limit its downward movement. A bolt 24 having a flat head 26 extends lengthwise through the casings 21 and 22 and down through the sleeve 11 which is held in the bracket 8. A compression spring 25 surrounds the bolt 24 and is confined between the head 26 of the bolt and the reduced portion $22^a$ of the lower casing 22. The normal compression of the spring 25 is regulated by means of a nut 27 which is screwed on the threaded lower end of the bolt 24.

As best shown in Fig. 3, the upper and lower ends of the threaded sleeve 11 are curved spherically and the lower end of the casing 22 and the upper face of the nut 27 are of similar spherical shape, all of these spherically curved surfaces being concentric around the center of the sleeve 11. Also, the inner diameter of the sleeve 11 is considerably greater than the diameter of the bolt 24. Therefore, when the parts are assembled, as shown in the drawing, the bolt 24, carrying with it the casings 21 and 22 and the nut 27, is free to rock in any direction with respect to the sleeve 11 within limits which depend on the difference in diameter between the bolt 24 and the bore of the sleeve 11. This difference in diameter may be varied as desired. The upper casing 21 conforms to this rocking movement of the bolt 24 by reason of its ball-and-socket connection to the side sill 2.

In order to provide proper lubrication for the moving parts the lower portion 18 of the socket which receives the ball 16 is provided with an outwardly extending lip 28 forming an oil cup 29 which communicates with the interior of the casing 21 by means of a channel 30.

The operation of this form of my shock absorber may best be understood by referring to Figs. 2, 4 and 5. Fig. 2 shows the normal position of the parts, the casings 21 and 22 being forced apart to their greatest extent. When the chassis and the axle are brought closer together, as shown in Fig. 4, the casing 22 rises in the casing 21 and the spring 25 is compressed upwardly. When the rebound occurs and the chassis rises with respect to the axle, the casings 21 and 22 return to their normal position and rise together along the bolt 24, the spring 25 being compressed downwardly with relation to the casings. The spring 24 thus offers an equal resistance to relative movement of the chassis and the springs either toward or or away from each other, and therefore operates in the manner described and broadly claimed in Letters Patent of the United States No. 1,380,780, granted to me June 7, 1921.

It will be observed that the head 26 of the bolt 24 and the upper flange 23 of the casing 22 slide within the outer casing 21 like pistons in an air cylinder, and these parts may be made to fit as tightly as desired within the casing 21. Consequently, each downward movement of the head 26 and each upward movement of the inner casing 22 compresses the air within the casing 21 to an extent depending on the tightness with which the parts fit together, and this compression of the air produces a resistance which assists the spring 25 in absorbing the shock. The compression of the air is only momentary, as the compressed air escapes to a considerable extent through the annular channel between the casing 22 and the casing 21. Therefore, when the rebound occurs and the piston-like member returns to its normal position, air is drawn in again through the channel between the casings 21 and 22. Since this annular channel is narrow there is an appreciable interval in which the air within the casing 21 is somewhat below atmospheric pressure, and this partial vacuum serves to cushion the rebound of the spring and vehicle to a considerable extent. In order to utilize this compression and rarefaction of the air in the most effective manner, openings may be drilled in the walls of the casing 21 to permit the passage of air to any desired extent.

Fig. 6 shows a modified form of my shock absorber in which the spring is composed of two sections 31 and 32, the upper section 31, as shown, being considerably heavier and stronger than the lower section 32. The two spring sections may be welded together, or otherwise united, to form an integral spring, but I prefer to separate the two sections by a spacing member 33 which is of suitable diameter to slide freely within a casing 34 and which has upper and lower shoulders or extensions 35 and 35ᵃ which form seats for the upper and lower ends of the springs 32 and 31, respectively. The casing 34 corresponds to the casing 22 in the device shown in Figs. 1 to 5 and slides vertically within an outer casing 36 which is provided with upper and lower ears or flanges 37 which loosely receive vertical bolts 38, which, like the bolts 19 of Fig. 1, serve to secure together the upper and lower portions 39 and 40 of the upper socket joint. The vertical bolts 38 extend through openings in ears or flanges 41 formed at the lower end of the inner casing 34, and nuts 38ᵃ are screwed upon the lower ends of the bolts 38 to limit the downward movement of the casing 34. The tension of the springs 31 and 32 may be regulated by means of the nuts 38ᵃ.

A central bolt 42ᵃ has its upper end screwed into a boss 44 formed at the top of the casing 36 and extends through the springs 31 and 32 and the spacing member 33 and through an opening 45 in the lower end of the casing 34. Below the opening 45 the bolt 42ᵃ extends through a sleeve 11 held in a divided bracket 12—12 and carries at its lower end a nut 27. The parts 11, 12 and 27 are similar in construction and function to the correspondingly numbered parts shown in Figs. 1 to 5. A pad of absorbent material 46 may be placed in the lower end of the casing 34 and may be saturated with oil to lubricate the lower end of the central bolt 43 and its attachments.

It will be observed that the lower shoulder or extension 35ᵃ of the spacing member 33 is longer than the upper extension and will strike the pad 46 in the bottom of the casing 34 before the lower spring section 32 is fully compressed. This prevents the spring 32 from being crushed, as might happen under a very severe shock. When the further compression of the spring section 32 is prevented by the engagement between the spacing member and the bottom of the casing 34, the upper and stronger spring section 31 is free to be compressed further, and the shock is thus fully absorbed. The springs 31 and 32 may obviously be united to bring the weaker section 32 above the stronger section 31 in which case the spacing member 33 will also be inverted.

The two spring sections 31 and 32 are compressed upwardly and downwardly by shocks of considerable severity after the manner of the single spring 25 shown in Figs. 1 to 5. However, since the spring 32 is weaker than the spring 31, the lower spring tends to operate independently to absorb ordinary minor shocks met with on fairly smooth roads. The strong spring 31 conforms to the movement of the spring 32 in absorbing these minor shocks and serves to cushion the rebound after each of these small shocks. When a shock of greater severity is encountered sufficient to compress the strong spring 31 as well as the weaker spring 32, the two springs act together and when the rebound occurs the weaker spring exerts a certain amount of drag on the stronger spring, thus tending to check the rebound. The rebound is mainly checked, however, by the pneumatic effects produced within the casings. In this form of my shock absorber there are no parts which operate like pistons, as shown in the construction of Figs. 1 to 5, but the compression and rarefaction of air within the casings takes place at each relative movement of the casings 34 and 36. When the springs are compressed, the air contained in the casings is likewise compressed and assists the springs, but when the rebound occurs and the springs are again free to extend the air in the casings is momentarily reduced below atmospheric pressure and this resists the rebound action of the springs. The pneumatic effects within the casings may be regulated to any desired extent by fitting the working parts loosely or tightly together, or by drilling holes through the walls of the casings to allow the passage of air to the desired extent.

Fig. 7 shows one manner in which my improved shock absorber may be applied either to the rear or front end of a vehicle, forming the supporting connection between the frame and the springs. The construction of the shock absorber here shown is similar to that shown in Fig. 5 and the corresponding parts are similarly numbered. In Fig. 7, however, the outer casing 21 is externally screw-threaded to receive a flanged sleeve 47 which forms an inverted cup resting upon the upper end of a balancing spring 48, the lower end of this spring being seated in a groove 49 formed in the upper face of a bracket 50 that performs the function of the bracket 8 in Figs. 1 to 5, and is attached by means of a bolt 51 to the rear end of one of the rear vehicle springs 52. The end of one of the side sills of the chassis is shown at 53 and carries a suitable bracket member 54 having an extension 55 in which is held a bolt 56 having a spherical outer end 57 which forms a portion of the upper ball and socket joint of the shock absorber. The sleeve member 54 is fastened to the side sill 53 by means of a bolt 58 which passes through openings in lugs 59 and forces them together.

In this form of my shock absorber the rear end of the vehicle body is supported on the balancing springs 48 and when the vehicle body and the axles approach each other the spring 48 assists the internal spring 25 in absorbing the shock. The rebound is absorbed by the inner spring 25 in the manner described above in connection with Figs. 1 to 6.

While I have shown and described in detail certain preferred embodiments of my invention, it is to be understood that the invention may be applied in various other ways and that no limitations are to be imposed on my invention except such as are indicated in the appended claims.

I claim as my invention:

1. A shock absorber comprising a vertical helical spring, a member extending through the said spring and having a head engaging one end thereof, a sleeve surrounding the said member beyond the said spring, the said sleeve having an internal diameter larger than the diameter of the said member and having spherically curved upper and lower ends, spring-compressing means interposed between the said sleeve and the said spring and having a spherically curved bearing surface engaging the said sleeve, and a nut screwed upon the outer end of the said member and having a spherically curved bearing surface engaging the end of the said sleeve.

2. A shock absorber comprising a vertical helical spring, a member extending through the said spring and having a head engaging the top thereof, a sleeve surrounding the said member below the said spring, the said sleeve having an internal diameter larger than the diameter of the said member and having spherically curved upper and lower ends, spring-compressing means interposed between the said sleeve and the said spring and having a spherically curved bearing surface resting upon the said sleeve, and a nut screwed upon the outer end of the said member and having a spherically curved bearing surface engaging the end of the said sleeve.

3. A shock absorber comprising two telescoping tubular casings having cooperating internal and external flanges to limit the outward movement of the inner casing, a helical spring extending from one end of the inner casing to the opposite end of the outer casing, an internal shoulder formed on the outer end of the said inner casing, a bolt extending through the said spring and having a head engaging one end thereof, an externally screw threaded sleeve surrounding the said bolt beyond the said casing, and a nut screwed upon the end of said bolt adjacent to the said sleeve, the said sleeve having its ends spherically curved and the said inner casing and the said nut having correspondingly curved bearing surfaces for engaging the ends of the said sleeve.

4. A shock absorber comprising two telescoping tubular casings having cooperating internal and external flanges to limit the outward movement of the inner casing, a helical spring extending from one end of the inner casing to the opposite end of the outer casing, an internal shoulder formed on the outer end of the said inner casing, a bolt extending through the said spring and having a head engaging one end thereof, an externally screw-threaded sleeve surrounding the said bolt beyond the said casing, and a nut screwed upon the end of said bolt with the said sleeve, the said sleeve having its ends spherically curved and the inner casing and said nut having correspondingly curved bearing surfaces for engaging the ends of the said sleeve, a bracket having an internally mounted forked portion for adjustably receiving the said sleeve, and a second bracket having a ball and socket connection to the outer end of the said outer casing.

In testimony whereof I, the said JOHN DAHLSTROM, have hereunto set my hand.

JOHN DAHLSTROM.

Witnesses:
   EDITH K. FREESE,
   JOHN F. WILL.